(12) United States Patent
Forster et al.

(10) Patent No.: US 11,203,501 B2
(45) Date of Patent: Dec. 21, 2021

(54) SYSTEMS AND METHODS FOR TRANSFERRING A FLEXIBLE CONDUCTOR ONTO A MOVING WEB

(71) Applicant: AVERY DENNISON RETAIL INFORMATION SERVICES, LLC, Mentor, OH (US)

(72) Inventors: Ian J. Forster, Chelmsford (GB); Michael A. Lake, Paw Paw, MI (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/148,310

(22) Filed: Oct. 1, 2018

(65) Prior Publication Data

US 2019/0103649 A1    Apr. 4, 2019

Related U.S. Application Data

(60) Provisional application No. 62/565,594, filed on Sep. 29, 2017.

(51) Int. Cl.
| | | |
|---|---|---|
| *B65H 37/00* | (2006.01) | |
| *B65H 27/00* | (2006.01) | |
| *G06K 19/077* | (2006.01) | |
| *B65H 57/04* | (2006.01) | |
| *H01Q 1/08* | (2006.01) | |

(52) U.S. Cl.
CPC .......... *B65H 27/00* (2013.01); *B65H 37/002* (2013.01); *B65H 57/04* (2013.01); *G06K 19/077* (2013.01); *H01Q 1/085* (2013.01)

(58) Field of Classification Search
CPC ................................ B65H 27/00; B65H 57/04
See application file for complete search history.

(56) References Cited

U.S. PATENT DOCUMENTS

| | | | |
|---|---|---|---|
| 3,239,396 A | * 3/1966 | Bohannon, Jr. ...... | H01B 7/0838 |
| | | | 156/52 |
| 5,525,175 A | * 6/1996 | Blenke .............. | A61F 13/15593 |
| | | | 156/161 |
| 6,107,920 A | 8/2000 | Eberhardt et al. | |
| 6,142,381 A | 11/2000 | Finn et al. | |

(Continued)

FOREIGN PATENT DOCUMENTS

| | | |
|---|---|---|
| EP | 1816592 | 8/2007 |
| EP | 2175400 | 4/2010 |

(Continued)

OTHER PUBLICATIONS

International Preliminary Report on Patentability dated Apr. 9, 2020 issued in corresponding IA No. PCT/US2018/053722 filed Oct. 1, 2018.

(Continued)

*Primary Examiner* — Philip C Tucker
*Assistant Examiner* — John Blades

(57) ABSTRACT

A roller features a circumferential trench into which a wire is deposited from a wire dispensing head having a wire dispensing tip. A moving web of material engages the roller as the roller rotates. The wire dispensing tip engages sidewalls of the trench so that the wire dispensing tip remains in the trench as the roller rotates. Wire from the trench is deposited onto the web of moving material and is secured thereto by fasteners or tape or adhesive or the like.

18 Claims, 5 Drawing Sheets

(56) References Cited

U.S. PATENT DOCUMENTS

| | | | |
|---|---|---|---|
| 6,161,761 A | 12/2000 | Ghaem | |
| 6,206,292 B1 | 3/2001 | Robertz et al. | |
| 6,262,692 B1 | 7/2001 | Babb | |
| 6,523,734 B1 | 2/2003 | Kawai et al. | |
| 6,604,686 B1 * | 8/2003 | Taban | G06K 19/07749 235/441 |
| 8,067,253 B2 | 11/2011 | Ferguson et al. | |
| 8,142,590 B2 * | 3/2012 | Rajala | A61F 13/49017 156/226 |
| 8,640,965 B2 | 2/2014 | Sutera | |
| 9,595,501 B1 | 3/2017 | Neuman | |
| 9,652,705 B1 | 5/2017 | Lindblad et al. | |
| 9,792,543 B2 | 10/2017 | Kuschewski | |
| 10,320,066 B2 | 6/2019 | Gragnic et al. | |
| 10,380,477 B2 | 8/2019 | Pueschner et al. | |
| 2005/0001785 A1 | 1/2005 | Ferguson et al. | |
| 2006/0054707 A1 | 3/2006 | Akita et al. | |
| 2007/0040037 A1 | 2/2007 | Koda et al. | |
| 2008/0155822 A1 | 7/2008 | Finn | |
| 2008/0179404 A1 | 7/2008 | Finn | |
| 2008/0283615 A1 | 11/2008 | Finn | |
| 2011/0023289 A1 | 2/2011 | Finn | |
| 2012/0217309 A1 | 8/2012 | Droz | |
| 2014/0354490 A1 | 12/2014 | Michalk | |
| 2015/0161501 A1 | 6/2015 | Krull et al. | |
| 2016/0224882 A1 | 8/2016 | Zhang | |
| 2017/0206448 A1 | 7/2017 | Pueschner | |

FOREIGN PATENT DOCUMENTS

| | | |
|---|---|---|
| GB | 2372012 | 8/2002 |
| WO | 03/032115 | 4/2003 |
| WO | 2014/008937 | 5/2017 |

OTHER PUBLICATIONS

International Search Report and Written Opinion dated Jan. 16, 2019 issued in corresponding IA No. PCT/US2018/053722 filed Oct. 1, 2018.

* cited by examiner

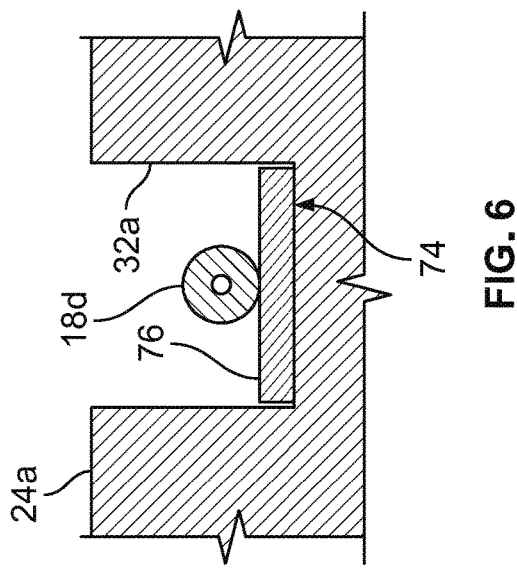
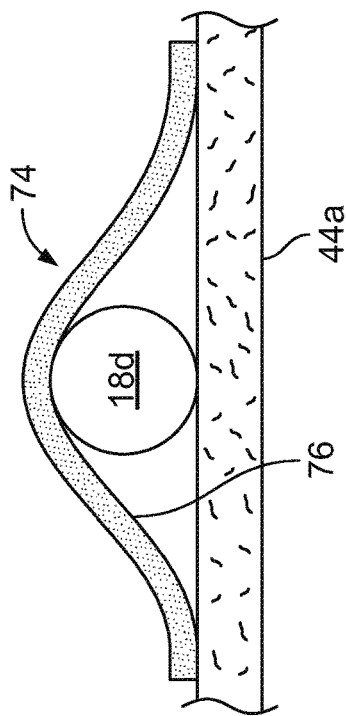
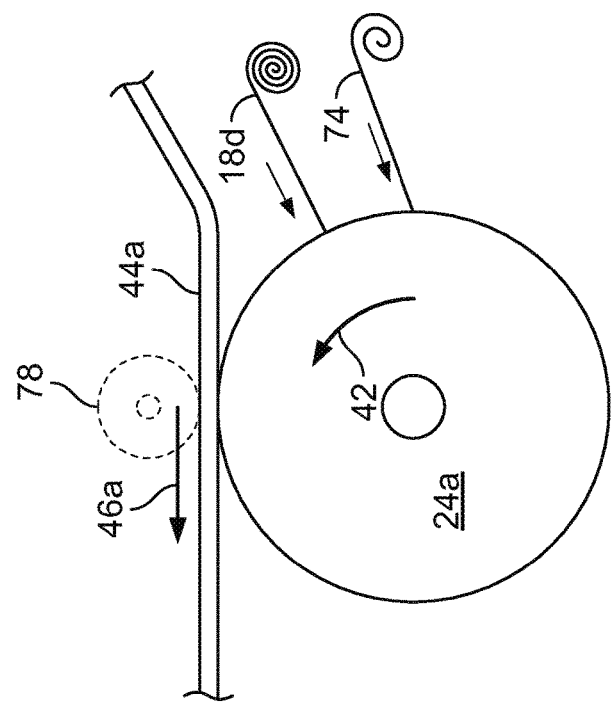

SYSTEMS AND METHODS FOR TRANSFERRING A FLEXIBLE CONDUCTOR ONTO A MOVING WEB

CROSS-REFERENCE TO RELATED APPLICATION(S)

The present application claims priority to and the benefit of U.S. Provisional Patent Application No. 62/565,594 filed Sep. 29, 2017, which is incorporated herein by reference in its entirety.

BACKGROUND

Field of the Disclosure

The present subject matter relates to antennas formed from flexible conductors and, more particularly, to systems and methods for transferring a flexible conductor onto a web of material for use in wireless communications technology.

Description of Related Art

Systems incorporating wireless communication technology, including Radio Frequency Identification (RFID) tags, are widely used for a variety of different applications, including inventory control, tracking, guarding and security systems. Such systems are well known in the retail industry, including use in connection with clothing inventory control and security from theft and other losses.

RFID tags may have a variety of integrated components, among them an RFID device or chip containing data such as an identification code for the type of product and/or product component and a unique identification code, allowing for immediate electronic identification and tracking of the exact item associated with the unique identification code. Other RFID tag components include an antenna electrically connected to the RFID chip or device, which is responsible for transmitting signals to and/or receiving signals from another RFID device or an RFID reader system.

RFID tags are often used on clothing, labels or other items or products made of fabric material ("fabric items"). A conductive wire or thread may be an efficient conductor for constructing an antenna, while also providing a degree of flexibility (particularly when having a circular cross section). In addition, depending on the material, such conductors may be deformed many times without fracturing or breakage. As a result, flexible conductors are desirable for use in forming antennas for RFID tags applied to fabric items. However, use of high pressures and temperatures during aggressive processes to securely attach flexible conductors to RFID devices and fabric items may result in damage to the fabrics.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect or embodiment of the present disclosure, a system for transferring a wire to a moving web of material having a material surface includes a roller having a roller surface with a circumferential trench formed therein. The trench includes a pair of opposing sidewalls and the roller is configured to rotate about an axis. A wire dispenser head is configured to receive wire from a wire supply. The wire dispenser head includes a wire dispensing tip through which wire exits the wire dispenser head. The wire dispensing tip is positioned within the trench of the roller and is configured to engage the pair of opposing sidewalls of the trench so that the wire dispensing tip remains positioned within the trench and wire is deposited into the trench as the roller rotates. The roller is configured so that the roller surface engages the material surface as the roller rotates so that wire is transferred from the trench onto the material surface.

In another aspect or embodiment, a system for transferring a wire to a web of material having a material surface includes a roller having a roller surface with a circumferential trench formed therein. The trench includes a pair of opposing sidewalls and the roller is configured to rotate about an axis. A wire dispenser head is configured to receive wire from a wire supply. The wire dispenser head includes a wire dispensing tip through which wire exits the wire dispenser head. The wire dispensing tip is positioned within the trench of the roller and is configured to engage the pair of opposing sidewalls of the trench so that the wire dispensing tip remains positioned within the trench and wire is deposited into the trench as the roller rotates. A system moves the web of material with respect to the roller so that the material surface engages the roller surface as the roller rotates so that wire is transferred from the trench onto the material surface.

In a further aspect or embodiment, a method for transferring a wire to a web of material having a material surface includes depositing the wire into a circumferential trench formed in a surface of a roller, rotating the roller about an axis, moving the web of material, engaging the material surface of the moving web of material with the rotating roller, transferring wire in the trench of the roller onto the material surface.

BRIEF DESCRIPTION OF THE DRAWINGS

FIG. 5 is a schematic illustration of another alternative embodiment of a system according to an aspect of the present disclosure;

FIG. 6 is an enlarged cross sectional view of tape and a wire positioned in a roller trench of the system of FIG. 5;

FIG. 7 is an enlarged cross sectional view of a wire attached to a web of material using tape by operation of the system of FIG. 5;

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Embodiments of the present disclosure provide systems and methods of dispensing wire into a shaped groove or trench in a roller to form the outline of an antenna and then depositing the antenna onto a moving web of material. As used herein, the term "wire" refers to any elongated, flexible conductor including, but not limited to, one or more cables, threads, wires or strands of electrically conductive material.

Figure 1:
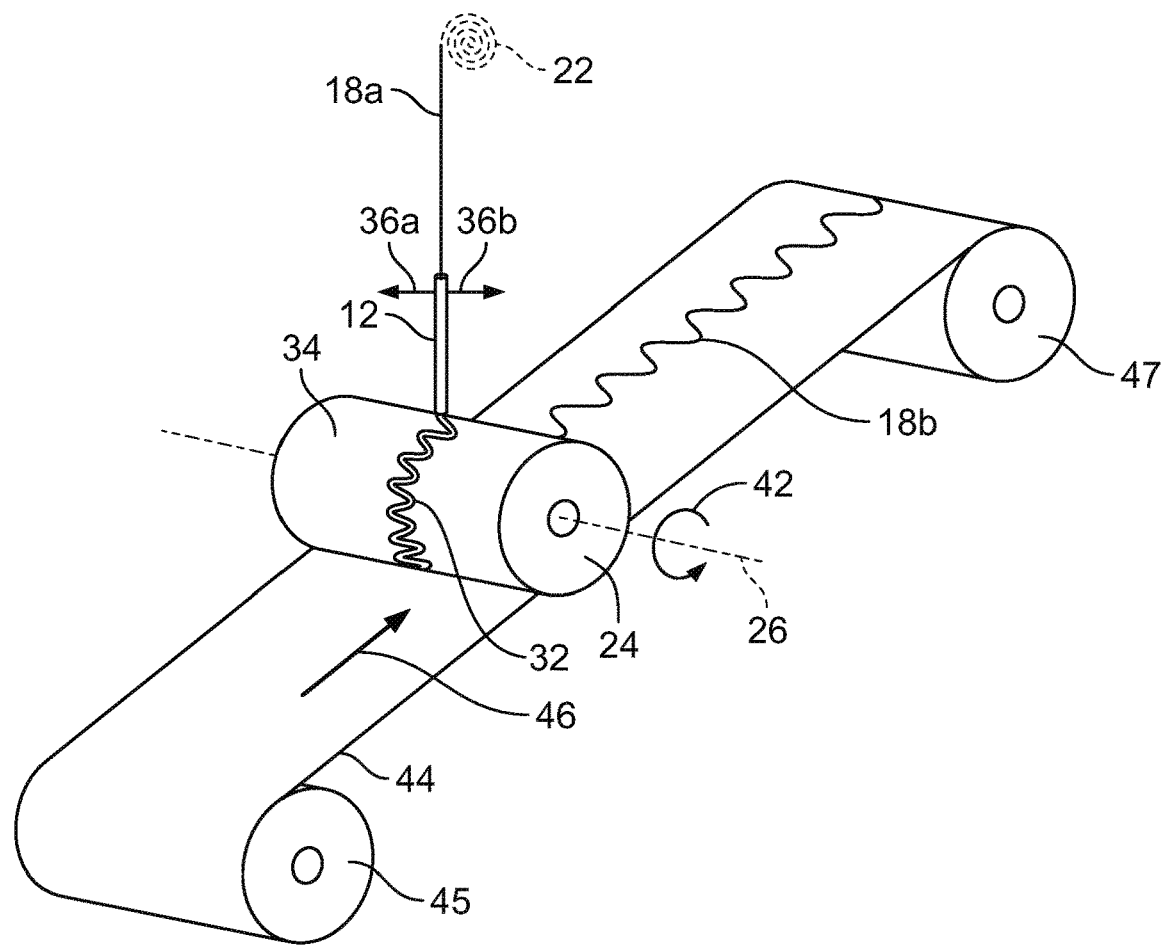
FIG. 1 is a schematic illustration of an embodiment of a system according to an aspect of the present disclosure.
Figure 2:
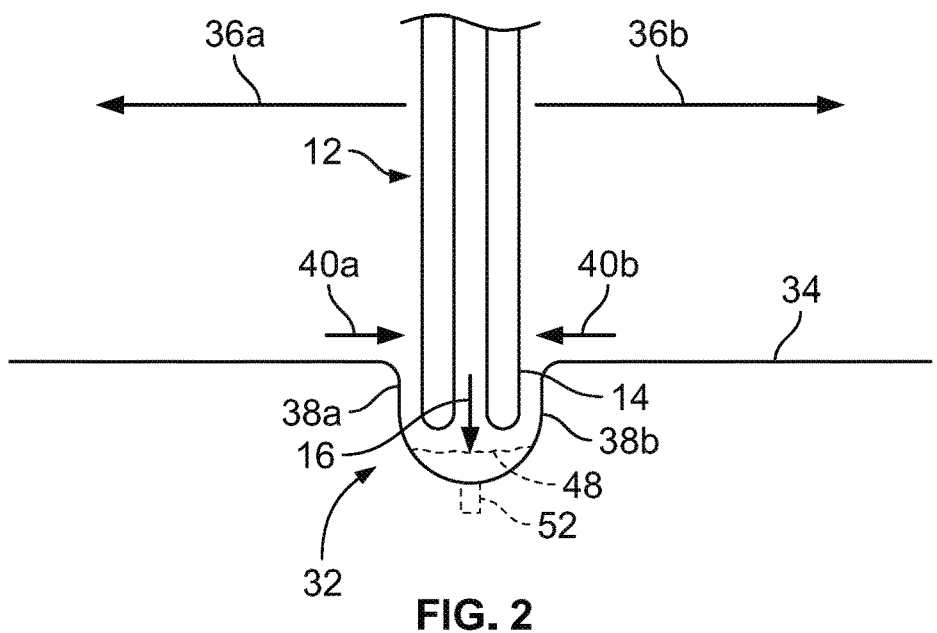
FIG. 2 is an enlarged schematic illustration of a wire dispensing tip and a trench of a roller of the system of FIG. 1.

An embodiment of a system according to an aspect of the present disclosure is illustrated in FIG. 1. A wire dispenser includes a head 12. As illustrated in FIG. 2, the head 12 has a dispensing tip, indicated at 14. The head 12 receives a wire 18a (FIG. 1) fed from a roll of the wire, illustrated in phantom at 22, or another supply source, and dispenses it through the dispensing tip 14, as indicated by arrow 16 of FIG. 2. As an example only, the wire dispensing tip 14 may be a conduit.

A roller 24 is rotationally mounted so as to rotate about a longitudinal axis, indicated in phantom at 26 in FIG. 1. The roller 24 has a continuous circumferential groove or trench 32 formed in the outer roller surface 34 of a defined width, depth and shape. The roller may be formed from steel or any other durable, rigid or semi-rigid material. While a wave-shaped trench 32 is illustrated, the trench may feature alternative shapes without departing from the scope of the present disclosure.

The wire dispenser head 12, or merely the dispensing tip 14, is mounted so that it is free to move generally in the directions of arrows 36a and 36b of FIGS. 1 and 2 (i.e., in direction parallel to the rotational axis 26), while preferably remaining in a generally fixed vertical position. As an example only, the wire dispenser head may be mounted in an overhead bracket or rack. The wire dispenser tip 14 may be mounted on a compliant material such as rubber where the force applied by the edges of the trench will distort it in the direction indicated. It should be noted that the amount of deflection obtainable by this simple form of mount is limited as the angle of the dispenser tip 14 engaged into the trench 32 changes with deflection. Alternatively, the dispenser 12 may be mounted on a linear track with a defined resistance to cross web motion, for example a linear track with the dispenser moving on a ball bearing. The defined resistance may also include a degree of damping to prevent unwanted oscillations of the dispenser position induced by the cross web motion. Alternatively, the cross web motion may be driven using an element such as an electrical linear actuator or air driven cylinder. The motion of the cylinder is driven to keep the dispenser head 12 in the trench 32. In one embodiment, the linear actuator provides a coarse element of the motion where the fine motion is provided by the dispenser head 12 being engaged in the trench 32 as before. This may be particularly advantageous when combining two forms of mount, a linear actuator for coarse motion and the tip being mounted on rubber for fine motion, as the rubber will also damp the motion and prevent vibration.

As illustrated in FIG. 2, the dispensing tip 14 of the wire dispenser head is positioned within the trench 32. As a result, the dispensing tip 14 is engaged by the sidewalls 38a and 38b of the trench 32 as the roller 24 (FIG. 1) rotates about the axis 26 in the direction of arrow 42. The resulting alignment forces, illustrated by arrows 40a and 40b in FIG. 2, cause the wire dispenser head 12 to move in the general direction of arrows 36a and 36b as the dispensing tip 14 traverses the trench 32, similar to the manner in which a needle follows the groove of a phonograph record. As a result, a self-guided wire dispenser is formed.

As illustrated in FIG. 1, a web of material 44 passes under, and engages the bottom of, the roller 24, and travels in the direction of arrow 46. As an example only, the directions of arrows 36a and 36b may be generally perpendicular to the direction of travel 46 of the web of material 44. As is known in the art, the web 44 is moved at a speed equal to the rotational velocity of the roller 24, which may have its own rotational drive system. As examples only, the web of material 44 may be fabric, paper or plastic. Suitable systems for moving or driving the web in the manner illustrated in FIG. 1 are known in the art and, as an example only, may include a feed roll of the material, indicated at 45, and a take-up roll, indicated at 47, which features its own rotational drive system (such systems being known in the art and generally understood in web handling technology).

As illustrated in FIG. 1, the roller 24 contacts the moving web 44 at a location different from the position that the wire 18a is dispensed into the trench 32 of the roller. While FIG. 1 illustrates the wire dispenser head 12 as being substantially diametrically opposed to the web of material 44 with respect to the roller 24 (i.e., spaced approximately 180° from the web of material 44 about the roller 24), it should be understood that the wire dispenser head 12 and the web of material 44 may be separated by some other angle about the roller 24 without departing from the scope of the present disclosure.

As the wire exits the dispensing tip 14 of the wire dispenser, it is deposited within the trench 32 of the roller. As a result, the wire takes on the shape of the trench. The wire 18a is dispensed at a rate consistent with the rotational velocity of the roller so that the wire is continuously deposited in the trench. The trench 32 is provided with an arrangement for securing the wire therein. The wire remains in the trench 32 until it comes into contact with the moving web 44 and is transferred thereto, while retaining the shape of the trench (wave-shaped in the embodiment of FIG. 1), as illustrated at 18b in FIG. 1. The transferred wire is attached to the web by methods such as adhesives or mechanical fasteners such as staples or stitches, by other bonding methods, ultrasonic welding and as will be described in greater detail herein.

An arrangement for securing the wire 18a within the trench 32 is provided in configurations where gravity could otherwise pull the wire out of the trench 32 before it is transferred to the web 44. Such an arrangement could include, for example, the provision of an adhesive in the trench (illustrated in phantom at 48 in FIG. 2) or a vacuum in the trench via ports (illustrated in phantom at 52 in FIG. 2) that are in fluid communication with a suction source. Other suitable securing arrangements may alternatively be used without departing from the scope of the present disclosure.

The positioning of the wire dispenser head 12 (i.e. the "dispense position") with respect to the moving web of material 44 may be varied from what is illustrated in FIG. 1 with respect to the roller 24, as noted above. For example, in FIG. 3A, when the web 44 is below the roller, with examples of possible dispense positions being illustrated at 12a, 12b and 12c. The distance around the roller from the dispense position can vary the amount of room available for other processes, such as attaching a chip to the wire. In cases 12a, 12b and 12c, the roller 24 must incorporate some arrangement for retaining the wire in the trench (described above with reference to FIG. 2) to prevent it from being pulled out by gravity before transfer to the web 44.

Figure 3A:
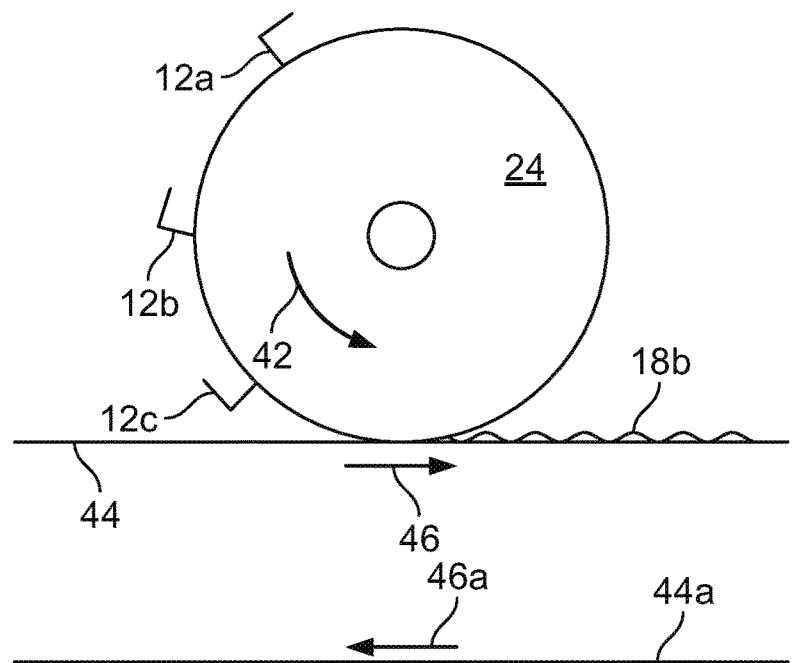
FIG. 3A is a schematic illustration of an alternative embodiment of a system according to an aspect of the present disclosure.
Figure 3B:
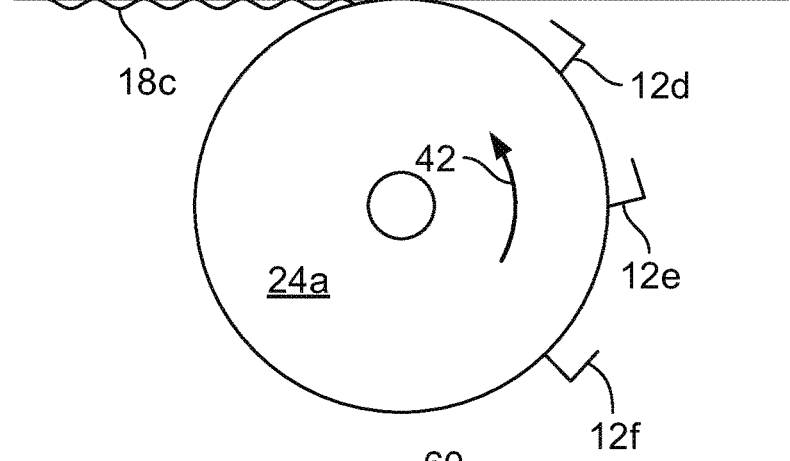
FIG. 3B is a schematic illustration of another alternative embodiment of a system according to an aspect of the present disclosure.

As illustrated in FIG. 3B, the web 44a may alternatively run above the roller 24a, with examples of possible dispense positions being shown as 12d, 12e and 12f. Position 12d, as it is above the roller 24a, can have the wire captive in the trench of the r36aoller by gravity, rather than requiring an additional arrangement for retaining the wire in the trench.

It should be understood that the positions illustrated in FIGS. 1, 3A and 3B are merely exemplary, and that positions other than those illustrated in FIGS. 1, 3A and 3B may alternatively be used for the dispense position and moving web position.

Figure 4:
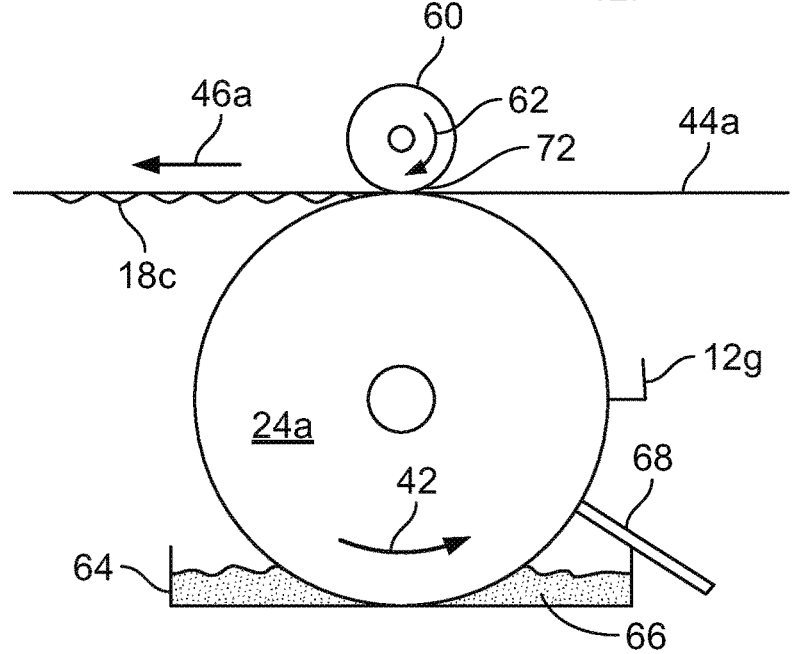
FIG. 4 is a schematic illustration of another alternative embodiment of the system of the disclosure.
Figure 9:
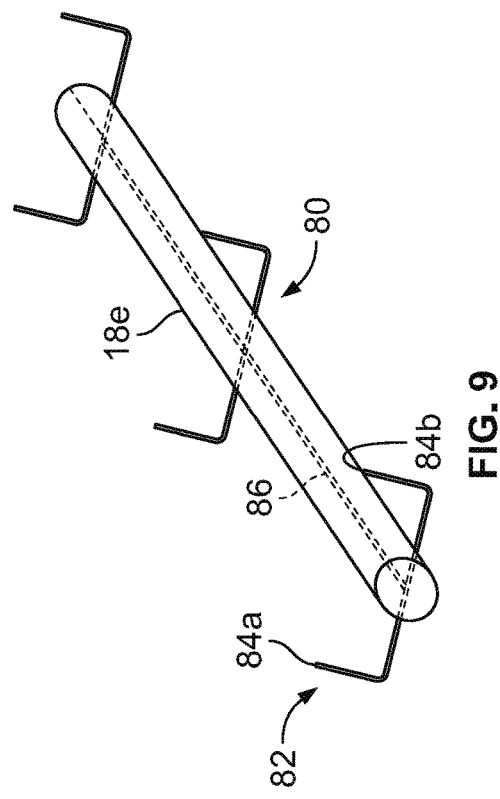
FIG. 9 is an enlarged perspective view of a wire and a fastener strip for use in the system of FIG. 8.

An alternative embodiment illustrated in FIG. 4 includes an arrangement where an adhesive is screened into the roller trench either before or after the wire is inserted. More specifically, a web of material 44a travels in the direction of arrow 46a and passes between, and is engaged by, roller 24a and a pinch roll 60, which are rotating in the directions of arrows 42 and 62, respectively. The roller 24a features a circumferential trench, such as trench 32 of FIG. 1. A trough 64 contains an adhesive 66, and the bottom portion of the roller 24a is submerged in the adhesive. As the trench of roller 24a passes through the adhesive 66, the adhesive fills (or partially fills) the trench. Excess adhesive is removed with a doctor or scraping blade 68. Wire from dispensing head 12g is deposited in the trench in the manner described above with respect to FIGS. 1 and 2, and is fully or partially submerged within the adhesive therein. The wire in the trench then travels to the nip point 72 and is transferred to the web of material 44a. The adhesive permits the wire to stick to the web when it is transferred thereto.

Types of adhesives 66 may include pressure sensitive, hot melt, ultraviolet curable and others. The placement of the adhesive into the trench can be screened but also delivered by other means, for example jetted in or extruded along with wire.

In an embodiment according to another aspect of the present disclosure, which is illustrated in FIGS. 5-7, a tape 74 is inserted into the trench of the roller 24a before or after the wire 18d. More specifically, a web of material 44a travels in the direction of arrow 46a and passes over, and is engaged by, roller 24a, which is rotating in the direction of arrow 42. The roller 24a features a circumferential trench, illustrated at 32a in FIG. 6. An adhesive tape 74 is deposited in the trench of the roller 24a, with a sticky side (76 in FIG. 6) facing radially outwards, using a tape dispenser head. The tape can be a double sided tape such that there is adhesive on both sides to secure the tape to the web in the trench and the wire to the tape. The tape dispenser head is movably mounted in the same manner as illustrated for wire dispenser head 12 in FIG. 1 and has a dispensing tip 14 positioned in the trench of the roller 24a in a manner similar to dispensing tip 14 of the wire dispenser head of FIG. 2. As a result, the tape dispensing tip stays within the trench 32a as the roller 24a rotates. Wire 18d from a dispensing head is deposited in the trench in the manner described above with respect to FIGS. 1 and 2. As a result, the wire 18d is placed on top of the sticky side 76 of the adhesive tape 74 in the trench 32a, as illustrated in FIG. 6.

Once deposited within the trench 32a of the roller 24a, the wire 18d and tape 74 are transferred to the web 44a and secured in place, as illustrated in FIG. 7. As a result, the wire 18d is secured to the web 44a via the tape 74. When a pressure sensitive adhesive is used on the tape 74, a pinch roll, indicated in phantom at 78 in FIG. 5, may be required to provide a nip, but other adhesives, as well as the pressure sensitive adhesive, may require heat in the form of heated rollers. If the trench is coated with a non-stick material such as polytetrafluoroethylene (PTFE), the wire and adhesive may be heated in the trench prior to transfer to the web.

As an example only, the tape may be a continuous strip of an adhesive, such as a hot melt or a thermoplastic polyurethane, that combines strength and adhesive properties on a surface such as fabric, or a composite of a fabric and an adhesive, which gives a high strength bonding the wire to the web surface.

In alternative embodiments, the tape 74 of FIGS. 5 and 6 may include sticky surfaces on both sides to aid in retaining the tape and wire within the trench 32a of the roller 24a, or in embodiments where the wire is deposited within the trench prior to the tape.

In an embodiment of the disclosure shown in FIGS. 8-10B, before the wire is placed in the trench of the roller 24a, a fastener strip 80 (FIG. 8) for securing the wire to the web of material 44a is inserted. The fastener strip, with reference to FIGS. 9-10B features a number of fastener or staple portions, indicated in general at 82, which are shown as each having a U shaped profile terminating in pointed ends 84a and 84b, although it should be understood that the fastener portions may be variously configured without departing from the scope of the present disclosure. The fastener strip may further include a backbone, illustrated in phantom at 86 in FIG. 9, securing the fastener portions 82 together. The fastener strip is preferably formed from plastic, or other soft, flexible material but other materials may be used.

Figure 8:
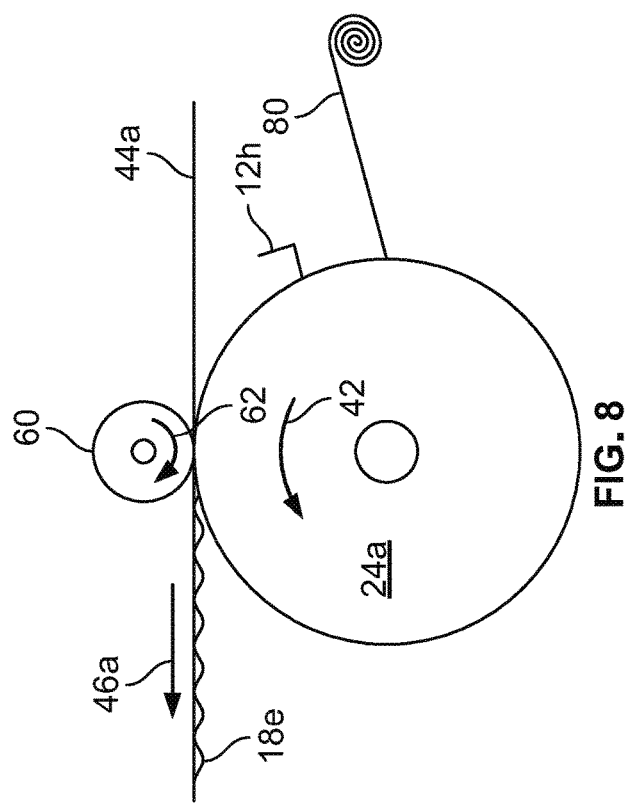
FIG. 8 is a schematic illustration of another alternative embodiment of a system according to an aspect of the present disclosure.

With reference to FIG. 8, a web of material 44a travels in the direction of arrow 46a and passes between, and is engaged by, roller 24a and a pinch roll 60, which are rotating in the directions of arrows 42 and 62, respectively. The roller 24a features a circumferential trench, such as trench 32 of FIG. 1.

The fastener strip 80 is deposited in the trench of the roller 24a, with the pointed ends 84a and 84b of the fastener portions 82 pointing radially outwards from the rotational axis of the roller 24a, using a fastener dispenser head. The fastener dispenser head is movably mounted in the same manner as illustrated for wire dispenser head 12 in FIG. 1 and has a dispensing tip positioned in the trench of the roller 24a in a manner similar to dispensing tip 14 of the wire dispenser head of FIG. 2. As a result, the fastener dispensing tip stays within the trench of the roller 24a as the roller rotates. Wire 18e (FIG. 9) from a dispensing head 12h (FIG. 8) is deposited in the trench of the roller 24a in the manner described above with respect to FIGS. 1 and 2. As a result, the wire 18e is placed on top of the fastener portions 82 and spine 86 of the fastener strip 80 in the manner illustrated in FIG. 9.

Figure 10A:
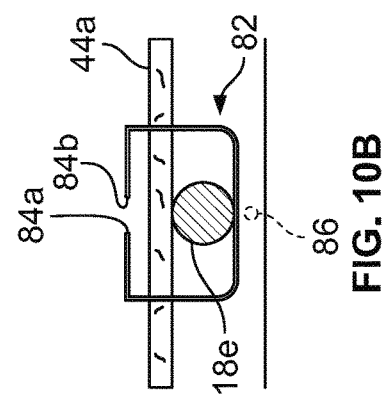
FIG. 10A is an enlarged cross sectional view illustrating a fastener portion of the fastener strip of FIG. 9 passing through a web of material during operation of the system of FIG. 8.
Figure 10B:
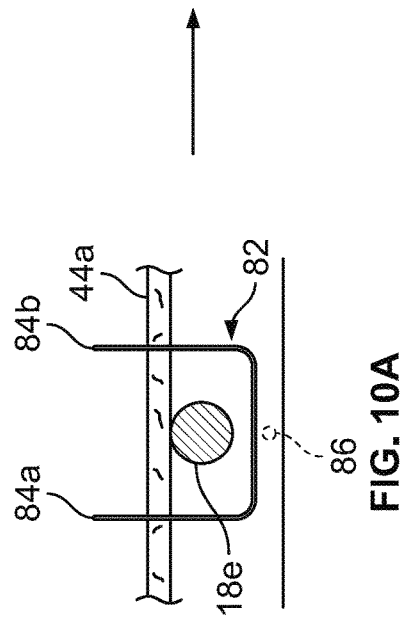
FIG. 10B is an enlarged cross sectional view illustrating the fastener portion of the fastener strip of FIG. 10A securing a wire to a web of material after use of the system of FIG. 8.

Once deposited within the trench of the roller 24a, the wire 18e and fastener strip 80 are transferred to the web 44a and secured in place. More specifically, when the wire and fastener strip are applied to the web 44a, the points 84a and 84b of the fastener portions 82 of the fastener strip penetrate the web material, as illustrated in FIG. 10A, and are then turned inward by the pinch roll (60 of FIG. 8), as illustrated in FIG. 10B, forming a mechanical connection similar to staples mechanically securing the wire to the fabric, as illustrated in FIGS. 8 and 10B.

Rather than a continuous fastener strip 80, discrete fastener portions or sections of plastic staples can be placed in the trench of the roller 24a to minimize the amount of plastic which may stiffen the web. An adhesive may be added at any of the above stages to better secure the wire and fastener structure.

Figure 11A:
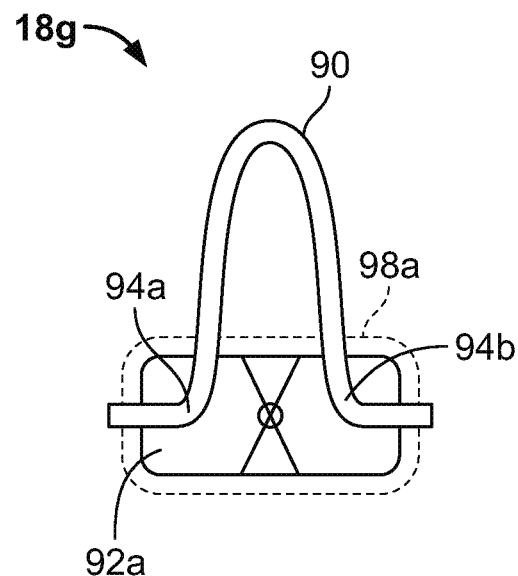
FIG. 11A is a schematic view of an electronic device being attached to a wire by operation of a system of the present disclosure.
Figure 11B:
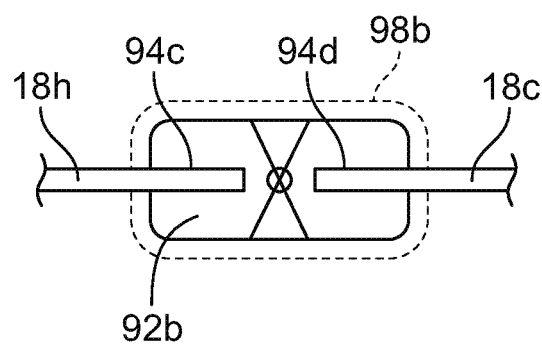
FIG. 11B is a schematic view of an electronic device being attached to wire sections by operation of a system of the present disclosure.

Methods of connecting a Radio Frequency Identification (RFID) device, or other electronic device, to a wire prior to transfer of the resulting RFID tag to a moving web of material using systems according to the present disclosure are illustrated in FIGS. 11A and 11B.

In FIG. 11A, a circumferential trench is formed in a roller, similar to trench 32 and roller 24 of FIGS. 1 and 2, so that a wire, indicated in general at 18g in FIG. 11A, deposited in the trench is formed with loops 90. As further illustrated in FIG. 11A, an electronic device, such as RFID device 92a, which may include electronic circuitry and, as examples only, can be an actual RFID device, a strap form or a bare die, is first positioned within the trench in a position so that the wire 18g, when introduced into the trench, in the manner described above with reference to FIGS. 1-8, overlays the RFID device. The wire 18g is then attached to the RFID device at contact points 94a and 94b to provide an antenna for the RFID device so that an RFID tag is formed, while the loop 90 provides a tuning inductance.

The RFID device 92a and the assembled RFID tag may be secured in the roller trench by, as examples only, a vacuum or low tack adhesive (discussed previously with reference to FIG. 2). In addition, the trench of the roller may optionally be provided with dedicated recesses, an example of which is indicated in phantom at 98a in FIG. 11A, configured to receive and hold a number of RFID devices 92a as the wire 18g is attached thereto and prior to transfer of the resulting RFID tags to a web of material.

The joints or connections between the wire 18g and the RFID device 92a at contact points 94a and 94b can be achieved in a number of ways known in the art. As examples only, a conductive adhesive, soldering, ultrasonic welding or electrical welding (or any other type of welding) may be used. In addition, a capacitive contact may be made by forming pads of the RFID devices over the wire with a non-conducting adhesive such as a pressure sensitive adhesive.

The contact between the RFID device and the wire can be achieved in a number of ways. The RFID device, e.g. strap based or bare die/chip, can be placed in an aperture in the trench before the wire is dispenser. The device may be coated with an adhesive, such as an isotropic conductive paste, which contains flakes of a conductor such as silver, an anisotropic adhesive, where a conductive paths is formed in a vertical direction when compressed and heated, of a non-conductive adhesive such as a PSA, where coupling between the wire and device is made by capacitance.

For soldering, a solder paste may be placed onto the device surface before the wire is placed in position. All of the above can be cured using pressure and, if needed, heat, applied by a pinch roller after the wire is dispensed. Alternatively, if the wire itself is heated, it may cause the joint to be formed when it is placed in contact with the bond pads of the device. For welding, a secondary tool may be used in the trench after the wire has been dispensed on top of the strap which applies such factors as ultrasonic energy, electrical energy or pressure to crimp the materials depending on what is required. It will be appreciated that similar methods may be used if the wire is dispensed into the trench before the strap is placed. Alternatively, the strap of other form of RFID device can be attached to the wire antenna when it has been transferred to the web of material as long as the web, such as fabric, is not damaged by the forces/heat used.

With reference to FIG. 11B, an RFID device 92b may be used to bridge a gap in a wire having sections 18h and 18i to form a portion of an antenna. Similar to the method described with reference to FIG. 11A, the RFID device 92b is initially positioned within the trench of the roller, and then a wire is introduced into the trench in the manner described above with reference to FIGS. 1-8 so as to overlay the RFID device. The RFID device 92b and resulting RFID tag may be secured within the trench of the roller using the methods described with reference to FIG. 11A.

After introduction into the trench, the wire is cut to form sections 18h and 18i. The wire can be cut by a blade at the aperture of the dispenser or alternatively, pre-determined sections can be fed to the trench. Where the wire is being driven out into the trench and not pulled by adhesion of the tape or adhesive in the trench, the wire will dispense into the trench and will have a gap, which then are attached to the RFID device 92b at contact points 94c and 94d using a method such as those described above with reference to FIG. 11A. Alternatively, the wire may be attached to the RFID device 92b at contact points 94c and 94d and then cut between the contact points by a blade or rotary cutter engaged into the slot that can be moved down to make a cut at a specific point so that wire sections 18h and 18i are formed. In yet another embodiment, the wire may be cut to form sections 18h and 18i prior to introduction into the trench.

As in the case of FIG. 11A, the trench of the roller may optionally be provided with dedicated recesses, an example of which is indicated in phantom at 98b in FIG. 11B, configured to receive and hold a number of the RFID devices 92a as the wire is attached thereto and prior to transfer of the RFID tag to a web of material.

The RFID tags produced using the methods of FIGS. 11A and 11B are attached to a web of material that may be positioned above the roller (examples provided in FIGS. 3B, 4, 5 and 8) or below the roller (examples provided in FIGS. 1 and 3A). The system may also include a pinch roll (such as pinch roll 60 of FIGS. 4 and 8) to provide a nip point to provide a force to transfer the wire and secure it in place on the RFID device.

Examples of advantages of the technology of the present disclosure may be observed where the RFID tags of FIGS. 11A and 11B are transferred onto a material such as a fabric for use in making care labels for clothing or other branding labels, e.g. woven labels which appear inside a garment or as an external embellishment of the brand or other logo.

The fabrics of such labels are typically soft fabrics that are not generally robust against high temperatures and pressures, and may be damaged if the RFID device and wire were instead applied to the fabric separately and then joined at the contact points. If the RFID device and wire are in the trench of the roller, as described above for FIGS. 11A and 11B, the connection can be made while avoiding damage to the fabric. More specifically, in a roller formed of a durable material such as steel, another steel tool can apply high pressures against it, useful in welding of all forms to hold the metals together. In addition, such a roller provides a solid surface with controlled thermal properties more suitable for the process of forming the connection point joints or connections.

Temperatures to cure conductive adhesives can exceed 150° C., and may need to be applied for a number of seconds. If the roller itself is heated, and an adhesive is jetted into the connection points between the wire and the RFID device, the required curing time can be achieved by properly choosing the roller diameter and rotation speed of the roller.

Furthermore, for ultrasonic welding, the joints or connections at the contact points (94a and 94b in FIG. 11A or 94c and 94d in FIG. 11B) are best made against a solid surface, such as the surface of the roller, as soft materials dissipate the ultrasonic energy.

The embodiments described above with reference to FIGS. 11A and 11B therefore provide a method of connecting an RFID device to a wire that is particularly effective, as the wire and device are embedded at the time of connection in the trench of the roller, where the latter is preferably constructed of a robust material, such as steel. The roller provides a stable base for connecting the RFID device to the wire using relatively high pressures and temperatures, which would damage a web of fabric or paper material if the connection were after transfer of the RFID device or wire to the material.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A system for transferring a wire to a moving web of material having a material surface comprising:
   a. a roller having a roller surface with a circumferential trench formed therein, said trench including a pair of opposing sidewalls and said roller configured to rotate about an axis; and
   b. a wire dispenser head configured to receive wire from a wire supply, said wire dispenser head including a wire dispensing tip through which received wire exits the wire dispenser head, said wire dispensing tip positioned within the trench of the roller and configured to engage the pair of opposing sidewalls of the trench so that the wire dispensing tip remains positioned within the trench and the received wire is deposited into the trench as the roller rotates,
   wherein said roller is configured so that the roller surface engages the material surface as the roller rotates so that the deposited wire is transferred from the trench onto the material surface.

2. The system of claim 1 wherein the wire dispensing tip includes a conduit.

3. The system of claim 1 wherein the roller is configured to be positioned under the moving web of material.

4. The system of claim 1 wherein the roller is configured to be positioned over the moving web of material.

5. The system of claim 1 further comprising a fastener dispenser head configured to receive fasteners from a fastener supply, said fastener dispenser head including a fastener dispensing tip through which received fasteners exit the fastener dispenser head, said fastener dispensing tip positioned within the trench of the roller and configured to be free to move with respect to the roller so that the fastener dispensing tip remains positioned within the trench as the roller rotates and the received fasteners from the fastener dispensing tip are deposited into the trench and transferred from the trench onto or through the material surface to secure the deposited wire to the material surface.

6. The system of claim 5 wherein the wire dispensing tip and a tape dispensing tip are positioned with respect to the roller so that received tape is deposited into the trench before the received wire is deposited into the trench and the deposited tape overlays the deposited wire to secure the deposited wire to the material surface.

7. The system of claim 1 wherein the roller includes a recess configured to receive an electronic device so that the deposited wire in the trench passes over the electronic device and the system
   further comprises a pinch roll configured to engage the web of material as the web of material engages the roller.

8. A system for transferring a wire to a web of material having a material surface comprising:
   a. a roller having a roller surface with a circumferential trench formed therein, said trench including a pair of opposing sidewalls and said roller configured to rotate about an axis;
   b. a wire dispenser head configured to receive wire from a wire supply, said wire dispenser head including a wire dispenser tip through which received wire exits the wire dispenser head, said wire dispenser tip positioned within the trench of the roller and configured to engage the pair of opposing sidewalls of the trench so that the wire dispensing tip remains positioned within the trench and the received wire is deposited into the trench as the roller rotates; and
   c. a system for moving the web of material with respect to the roller so that the material surface engages the roller surface as the roller rotates so that the deposited wire is transferred from the trench onto the material surface.

9. The system of transferring of claim 8 wherein the system for moving the web of material includes a feed roll and a take-up roll with the web of material extending therebetween and traveling from the feed roll to the take-up roll.

10. The system of transferring of claim 8 wherein the roller is configured to be positioned over the moving web of material.

11. The system of transferring of claim 8 further comprising a fastener dispenser head configured to receive fasteners from a fastener supply, said fastener dispenser head including a fastener dispensing tip through which received fasteners exit the fastener dispenser head, said fastener dispensing tip positioned within the trench of the roller and configured to be free to move with respect to the roller so that the fastener dispensing tip remains positioned within the trench as the roller rotates and the received fasteners from the fastener dispensing tip are deposited into the trench and the deposited fasteners are transferred from the trench onto or through the material surface to secure the deposited wire to the material surface.

12. The system of transferring of claim 11 wherein the wire dispensing tip and the fastener dispensing tip are positioned with respect to the roller so that the received fasteners are deposited into the trench before the received wire is deposited into the trench and the deposited fasteners overlay the deposited wire to secure the deposited wire to the material surface.

13. The system of transferring of claim 8 further comprising a tape dispenser head configured to receive tape from a tape supply, said tape dispenser head including a tape dispensing tip through which received tape exits the tape dispenser head, said tape dispensing tip positioned within the trench of the roller and configured to be free to move with respect to the roller so that the tape dispensing tip remains positioned within the trench as the roller rotates and the received tape from the tape dispensing tip is deposited into the trench and the deposited tape is transferred from the trench onto the material surface to secure the deposited wire to the material surface.

14. The system of transferring of claim 13 wherein the wire dispensing tip and the tape dispensing tip are positioned with respect to the roller so that the received tape is deposited into the trench before the received wire is deposited into the trench and the deposited tape overlays the deposited wire to secure the deposited wire to the material surface.

15. The system of transferring of claim 8 further comprising a trough configured to contain an adhesive and positioned so that a portion of the roller surface passes through the trough so that adhesive in the trough is introduced into the trench.

16. The system of transferring of claim 8 wherein the roller includes a recess configured to receive an electronic device so that the deposited wire in the trench passes over the electronic device.

17. The system of transferring of claim 8 further comprising a pinch roll configured to engage the web of material as the web of material engages the roller.

18. The system of claim 1, further comprising means for securing the wire, the means being selected from the group consisting of a liquid adhesive, a tape, and a mechanical fastener.

* * * * *